May 8, 1923.
J. ECKERT
1,454,508
GEAR WHEEL AND METHOD OF MANUFACTURING THE SAME
Filed May 24, 1920
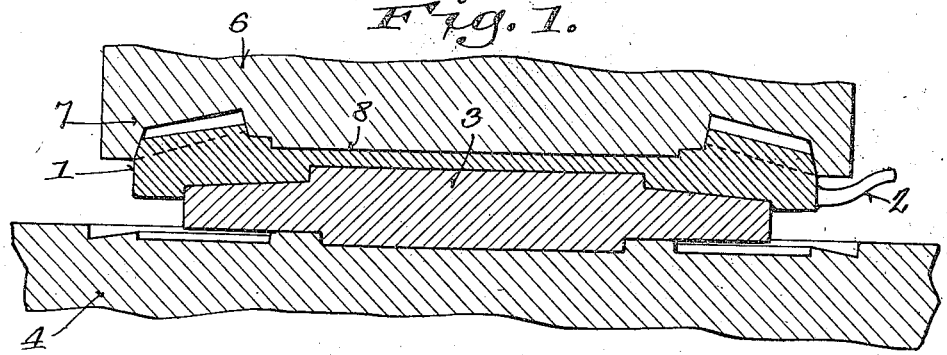
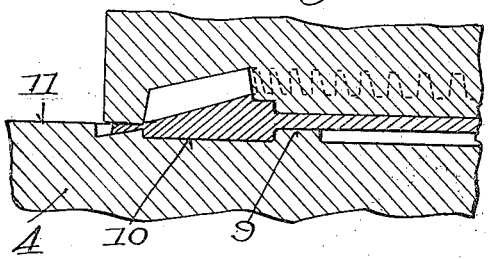
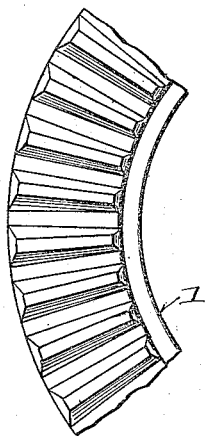
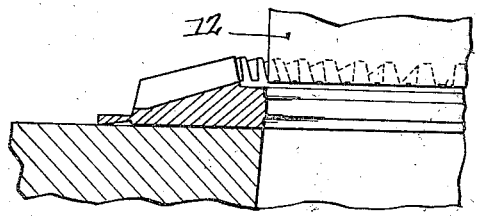
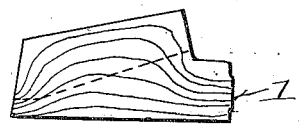
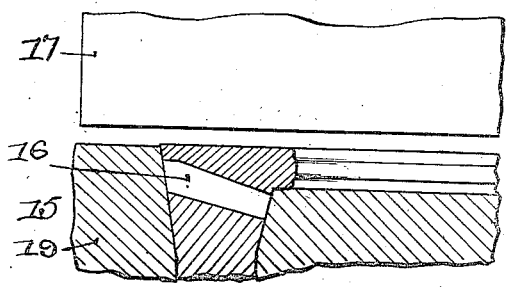
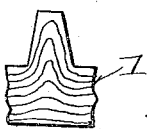
Inventor
John Eckert
By Erwin Wheeler & Woolard
Attorneys.

Patented May 8, 1923.

1,454,508

UNITED STATES PATENT OFFICE.

JOHN ECKERT, OF MILWAUKEE, WISCONSIN.

GEAR WHEEL AND METHOD OF MANUFACTURING THE SAME.

Application filed May 24, 1920. Serial No. 383,849.

*To all whom it may concern:*

Be it known that I, JOHN ECKERT, a citizen of the United States, residing at Milwaukee, county of Milwaukee, and State of Wisconsin, have invented new and useful Improvements in Gear Wheels and Methods of Manufacturing the Same, of which the following is a specification.

My invention relates to improvements in gear wheels and methods of manufacturing the same, and pertains especially to gear wheels having teeth projecting laterally from the normal plane thereof, such, for example, as bevel gear wheels and crown wheels.

The object of this invention is to expedite the manufacture of bevel and crown gear wheels by hammer forging them from blocks or plates of rolled steel in such a manner as to completely contour the working faces of the teeth during the hammering operation. Also to provide gear wheels of exceptional strength, the surfaces of the teeth being densified or hardened by hammering during the forging operation without scraping or otherwise roughening the surfaces during such operation. I have discovered that it is possible by this process to not only form bevel gear wheels and crown wheels with great rapidity in a single set of hammer forges, but that such wheels may be so formed as to be substantially perfect in contour. By the present process, the drawbacks to rolled gear manufacture,—particularly that due to the wave motion, that is to say, the wave that is produced in the rolling blank in advance of the point of contact of the rolling shaping tool, and the scraping motion due to the withdrawal of the teeth of the shaping tool from the revolving blank,—are avoided. Also, the drawbacks to the forming of gears by a pressing operation, such as that secured by the use of a hydraulic press,—particularly that of sticking and subsequently cooling in the press,—are avoided. In a hydraulic press, for instance, the teeth of the gears which are located between the teeth of the die cool down and tend to grip the teeth of the forming die, even tho the teeth of the forming die may be coated with graphite. By the present process the temperature of the blank is maintained by the continual blows of the hammer and also all of the parts of the gear are simultaneously subjected to the same sudden impulses or blows, thereby preventing wave motion and uneven stresses; and also preventing sticking by the jarring action of the blows.

In general, my process may be described as follows:—

Pieces of metal of a generally rectangular form and of the required mass are cut from sheets or bars of rolled steel, each piece being provided with a projection or tong hold extending from one corner or side to facilitate manipulation by means of tongs, such as are commonly used for manipulating work in a forging shop or plant.

These pieces of metal are heated to a working temperature, and then by means of the tongs they are successively placed upon a stationary die or anvil, and hammered into shape by a reciprocating plunger, the working contour of which is a counterpart of the face portion of the gear wheel to be formed. In other words, the lower end of the plunger or hammer constitutes a pattern to which the working face of the gear wheel is to be conformed. The central portion of the plunger or hammer projects below the concentric portion which carries the hammer teeth, and this central portion is brought into increasingly close proximity to the opposing surface of the anvil as the plunger is reciprocated, thereby forcing the metal to flow radially into the portion of the blank on which the teeth are being formed. Therefore, when the heated metal is placed upon the relatively stationary die and the plunger reciprocated into and out of contact with the blank, the latter will be quickly hammered into shape and teeth of the desired contour formed on its upper surface. The remainder of the blank will in the meantime assume the form of a wheel having a comparatively thin central web and an outer marginal portion concentric with the annular row of teeth.

The wheel is then placed in a punching press having a die provided with a centrally disposed circular cavity and the central portion is driven out by a cylindrical punch, leaving a marginal web within the annular row of gear teeth to be utilized in mounting the gear wheel upon a shaft flange or other appropriate support. Its outer margin is then trimmed off in another press, and it is then dipped in water and the scale removed by a wire brush.

The cleaned wheel is then inverted, and placed upon the relatively stationary finishing die or anvil of another hammer forge, this anvil die having pattern teeth between which the teeth of the wheel are entered. The hammer of this forge has a working face conforming in contour to the rear face of the wheel, and by reciprocating the hammer into and out of contact with the work, in a final hammering operation, the teeth may be driven into perfect conformity with the contour of the anvil die, after which the tong hold may be broken off, and the web and outer margins of the wheel finished in a turning lathe or otherwise machined. No finishing work is required for the surfaces of the gear teeth. The working faces of the teeth will be found to be perfectly conformed to the pattern.

Before finishing, the gear wheels are annealed and normalized to relieve them of internal strains. They are subsequently heat treated to harden them and develop the desired temper.

The blanks are preferably made large enough to enable them to be hammered into gear wheels of a diameter in excess of the finished gear wheels for the reason that the marginal portion of the stock at the outer ends of the teeth are thickened, and these thickened portions are cut away in the machining operation, thus enabling me to finish the peripheral margin of the wheel and simultaneously contour the same as required.

My improved method and its product will now be further explained with reference to the accompanying drawings, in which,—

Fig. 1 is a central vertical sectional view of the working parts of a contouring hammer forge with a spreader in position on the anvil as it appears during the initial step of hammering the metal into a circular wheel having a thickened annular portion upon which an annular row of gear teeth is being upset by the hammer.

Fig. 2 is a half-section of the same with the spreader removed and the blank ready for removal after the second hammering operation following the removal of the spreader.

Fig. 3 is a vertical sectional view of a punch as it appears during the operation of removing the central portion or web of the gear wheel.

Fig. 4 is a sectional view of the wheel after the center has been removed and the exterior trimmed.

Fig. 5 is a view of the blank in position in the finishing hammer forge, this forge and the wheel being illustrated in central vertical section.

Fig. 6 is a fragmentary view of the gear wheel as delivered from the finishing forge.

Fig. 7 is a sectional view showing a fragment of the completed wheel and indicating the grain lines.

Fig. 8 is a fragmentary cross section of one of the teeth and a portion of the back also showing the grain lines.

A block or piece of rolled steel 1, having a tong hold 2, is heated in a furnace to a forging temperature, and then placed upon a circular spreader 3 loosely mounted upon the anvil 4 of a contouring hammer forge.

I provide the hammer 6 of the forge with a working surface which conforms generally in shape to the toothed face of the gear wheel to be formed. For convenience, it will be referred to as the hammer die. It has an annular portion 7, which, if a beveled gear wheel is to be produced, will be inclined at the proper pitch and radially grooved to serve as a pattern for the teeth of the gear wheel to be formed. The central portion 8 is in the form of a disk and is in such a relation to the toothed portion that when the hammer is brought into contact with the heated work, the latter will be driven outwardly and caused to flow into the portion from which the teeth are formed, the latter being thickened and also upset and conformed to the contour of the portion 7. The outward or radial flow of the metal is considerable during the initial hammering operation, due to the fact that the central portion of the spreader is driven upwardly into the metal from the under side. After a few blows of the hammer the spreader is removed and the hammering operation continued until the teeth are upset to substantially their full height, the central portion of the web being in the meantime driven downwardly upon the portion 9 of the anvil. This portion 9 of the anvil is slightly raised above the surrounding portion 10 which receives the thicker portion of the wheel, and is encircled by a raised portion 11 which limits the outward flow of the metal.

The wheel thus formed in the contouring hammering forge is then removed from such forge and the central portion removed by a punch 12, the die of which has a circular aperture of the required diameter. The ragged outer margin is then similarly trimmed off by a cylindrical punch (not shown), after which the resulting toothed ring is dipped in water and the scale removed by a wire brush.

The wheel is then inverted and placed upon the anvil die 15 of a finishing hammer forge having a radially grooved annular portion 16 which has been perfectly contoured to serve as a pattern for the gear teeth. The upset teeth of the wheel enter the grooves of the pattern, and the hammer 17 of this forge is reciprocated upon the back side of the wheel to force the latter into substantially perfect conformity with the pattern. This anvil or pattern die 15 has an outer circular marginal portion 19 of somewhat greater diameter than the gear wheel when finished, and the teeth on the wheel are a little wider than on the finished gear wheel. Therefore, the portions most likely to be imperfect may be trimmed or cut or ground away in a lathe, or finishing machine. Owing to the fact that in the initial or contouring hammer forge, and also to some extent in the finishing forge, the flow of metal is radial, from the central portion outwardly, all but the extreme outer portions of the teeth may be fully conformed to the pattern die with a few strokes of the hammer.

The reversal of the wheel in the finishing hammer forge, and the fact that the hammer is applied to the rear face in this forge, is also an important feature of my process. By using a perfect contouring anvil, perfect teeth may thus be formed, and distortion of the pattern is much less apt to occur than in the initial contouring hammer forge. But in the initial or contouring hammer forge it is very important to employ a patterned hammer, as the teeth are thereby readily upset by the impacts of such a hammer upon the heated metal.

After the wheel has been contoured in the finishing hammer forge it is allowed to cool, and is subsequently heat treated to harden and temper it. It is also trimmed or finished by cutting or grinding away the surplus material, and faced off along the inner and outer margins. As above stated, the teeth require no finishing operation, being wholly contoured in the hammer forges. In fact, it is not desirable to cut them as their hammered surfaces are not only perfect, but strengthened by the hammered process and the grain lines of the metal extend from the back or body into and out of the teeth along curved lines, as illustrated.

It will of course be understood that the anvils and hammers, as well as the work may be cleaned by a blast of steam or air while in operation, in accordance with well known forging practice.

By hammering the metal into the desired shape, the succession of quick impacts makes it possible to readily conform the metal; maintain its temperature during the entire operation; avoid adhesion, wave motion, and uneven strains, and also the necessity of employing as heavy pressure as would otherwise be required. The hammering process also facilitates securing perfect conformity of the teeth, and it is my belief that it produces better and stronger teeth than can be produced by presses in which impacts are avoided.

The teeth require no finishing whatever, their bearing surfaces being very hard, smooth, and perfectly conformed to the pattern, and the grain of the metal being continuous from the body into and out of the teeth along curved lines, whereby teeth of great strength and durability are produced. Improved beveled gear wheels made in accordance with my process are peculiarly adapted for use in the transmission line of motor driven vehicles where shearing and breaking of gear teeth has heretofore caused much annoyance and expense.

I claim:

1. The method of forming gear wheels having laterally projecting teeth, consisting in heating blocks of metal, hammering them with a pattern die having an annular row of grooves into which the teeth may be upset, inverting the wheel thus formed and placing the same in a similarly contoured relatively stationary pattern die and hammering the other face of the wheel to force the teeth into final conformity with such die.

2. The method of forming gear wheels having laterally projecting teeth, consisting in heating blocks of metal, hammering them with a pattern die having an annular row of grooves into which the teeth may be upset, inverting the wheel thus formed and placing the same in a similarly contoured relatively stationary pattern die, hammering the other face of the wheel to force the teeth into final conformity with such die, and subsequently trimming the margins of the wheel to form the completed gear wheel.

3. The method of forming gear wheels having laterally projecting teeth, consisting in placing blocks of heated metal upon an anvil having a circular recess, hammering said metal with a circular pattern die provided with an annular row of radially extending grooves in which the metal is upset to form teeth, and simultaneously hammering the central portion of the metal to cause the same to flow radially into said upsetting portions, reversing the metal and placing its toothed portion in a similar pattern die and hammering the opposite side thereof to force the upset teeth into more perfect conformity with the grooves in such pattern die, and then removing, trimming and heat treating the resulting product.

4. The method of forming gear wheels having laterally projecting teeth, consisting in placing blocks of heated metal upon an anvil having a circular recess, hammering said metal with a circular pattern die provided with an annular row of radially extending grooves in which the metal is upset to form teeth and simultaneously hammering the central portion of the metal to cause the same to flow radially into said upsetting portions, removing the scale from the wheel thus formed, punching out the central portion, placing the wheel in an anvil die having grooves to receive said teeth, forcing the metal into conformity with such walls, and subsequently trimming the margins of the wheel and heat treating and tempering the same.

5. The method of forming gear wheels, consisting in heating a block of metal, forcing it to assume an annular shape and upsetting an annular row of teeth thereon to form a wheel having the general contour of the desired gear wheel, and subsequently placing the wheel in a finishing die having teeth receiving channels contoured to correspond with the teeth of the finished wheel and forcing the metal into conformity with said finishing die by a succession of blows.

6. A gear wheel having upset teeth provided with directly hammered faces and having a rear hammered surface.

7. The method of forming gear wheels comprising heating blanks of metal and hammering them into conformity with a pattern having grooves accurately contoured to the working faces of the teeth of the desired gear wheel.

8. The method of forming gear wheels comprising forming metal into the general contour of a gear wheel, placing the same in a pattern die having grooves accurately contoured in conformity with the working faces of the desired gear teeth, and subjecting the metal to a succession of rapid impacts to simultaneously force all of the teeth into conformity with all of the grooves in the pattern die.

9. A gear wheel having teeth provided with hammered working faces, said faces being finished by final hammering.

In testimony whereof I affix my signature in the presence of two witnesses.

JOHN ECKERT.

Witnesses:
A. J. McKerihan,
O. C. Weber.